(12) United States Patent
Hasegawa

(10) Patent No.: US 7,170,392 B2
(45) Date of Patent: Jan. 30, 2007

(54) RADIO PAGER

(75) Inventor: Kazuhiko Hasegawa, Shizuoka (JP)

(73) Assignee: NEC Corporation, Tokyo (JP)

( * ) Notice: Subject to any disclaimer, the term of this patent is extended or adjusted under 35 U.S.C. 154(b) by 441 days.

(21) Appl. No.: 10/687,072

(22) Filed: Oct. 16, 2003

(65) Prior Publication Data
US 2004/0135672 A1 Jul. 15, 2004

Related U.S. Application Data

(63) Continuation-in-part of application No. 09/245,437, filed on Feb. 5, 1999, now abandoned.

(30) Foreign Application Priority Data
Feb. 6, 1998 (JP) .................... 10-262220

(51) Int. Cl.
*H04Q 7/14* (2006.01)
(52) U.S. Cl. .................... 340/7.55; 345/184
(58) Field of Classification Search .............. 340/7.48, 340/7.52, 7.55; 345/684, 184
See application file for complete search history.

(56) References Cited

U.S. PATENT DOCUMENTS

| | | | |
|---|---|---|---|
| 4,821,021 A | 4/1989 | Ide et al. | |
| 5,258,751 A | 11/1993 | DeLuca et al. | |
| 5,268,880 A | 12/1993 | Meister et al. | |
| 5,652,571 A | 7/1997 | Shima et al. | |
| 5,757,279 A | 5/1998 | Fujiwara | |
| 5,825,353 A | 10/1998 | Will | |
| 5,835,084 A | 11/1998 | Bailey et al. | |
| 5,856,827 A * | 1/1999 | Sudo | 715/841 |
| 5,923,265 A | 7/1999 | Noirjean et al. | |
| 5,966,113 A | 10/1999 | Hidaka et al. | |
| 5,999,827 A | 12/1999 | Sudo et al. | |
| 6,021,336 A * | 2/2000 | Kunihiro et al. | 455/550.1 |
| 6,064,877 A * | 5/2000 | Yanagida | 455/412.1 |
| 6,100,813 A | 8/2000 | Yamaguti et al. | |
| 6,163,312 A | 12/2000 | Furuya | |
| 6,169,882 B1 | 1/2001 | Amma | |

FOREIGN PATENT DOCUMENTS

| | | |
|---|---|---|
| JP | 3-16750 | 2/1991 |
| JP | 3-198537 | 8/1991 |
| JP | 4-257127 | 9/1992 |

(Continued)

*Primary Examiner*—Edwin C. Holloway, III
(74) *Attorney, Agent, or Firm*—Scully, Scott, Murphy & Presser P.C.

(57) ABSTRACT

A radio pager of the present invention displays a number of stored information in an as ascending order or a descending order selected by the user on a rotary switch included in the pager. In addition, the pager allows the user to see and desired information first by rearranging the information in a storage area on the basis of an information number, a confirmation flag, and a content. The user can therefore select personal and shared information stored in the pager by turning the rotary switch in a jog dial fashion in the ascending order or the descending order or even in any desired order. This enhance easy and efficient search and rapid information selection. The user can also input various data management commands into the radio pager via an interface means 20.

10 Claims, 17 Drawing Sheets

FOREIGN PATENT DOCUMENTS

| | | |
|---|---|---|
| JP | 5-136723 | 6/1993 |
| JP | 6-77880 | 3/1994 |
| JP | 7-500713 | 1/1995 |
| JP | 8-79364 | 3/1996 |
| JP | 8-186852 | 7/1996 |
| JP | 8-340563 | 12/1996 |
| JP | 9-34620 | 2/1997 |

* cited by examiner

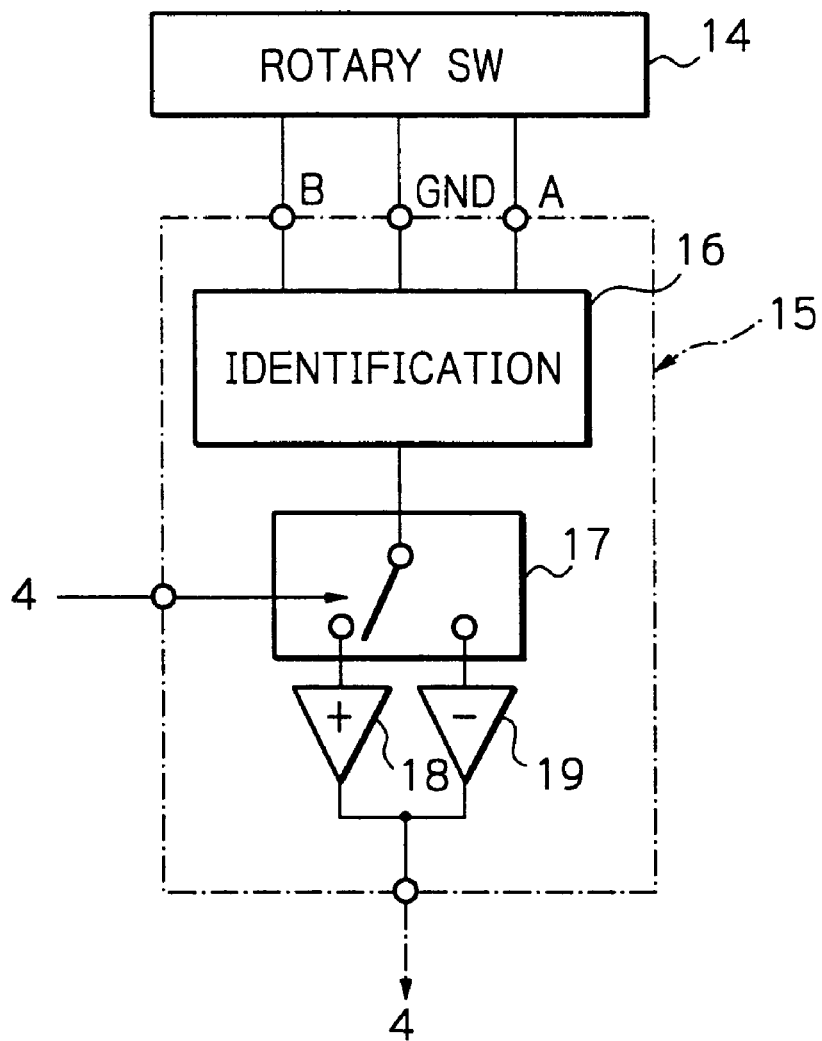
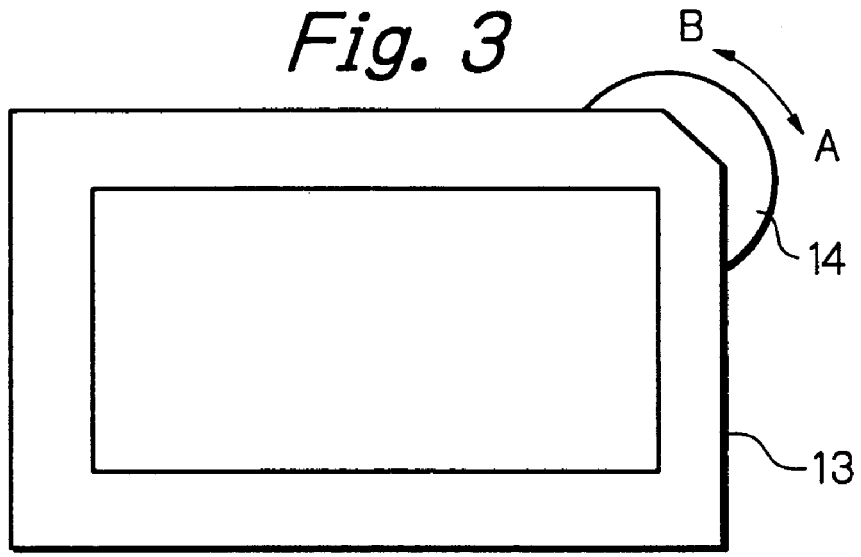

| DIRECTION A | (A-GND) | |
| | (B-GND) | |
| DIRECTION B | (A-GND) | |
| | (B-GND) | |

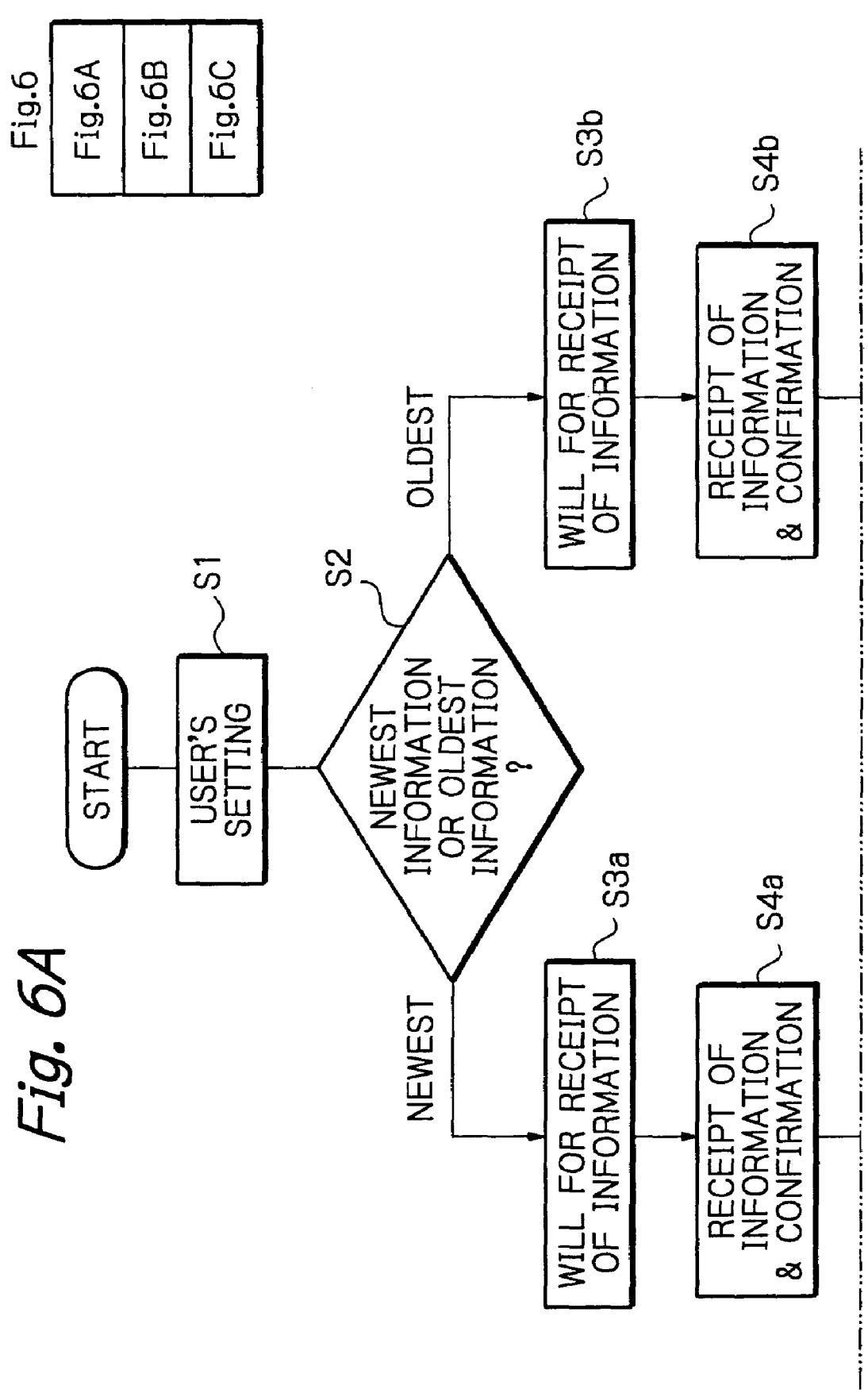

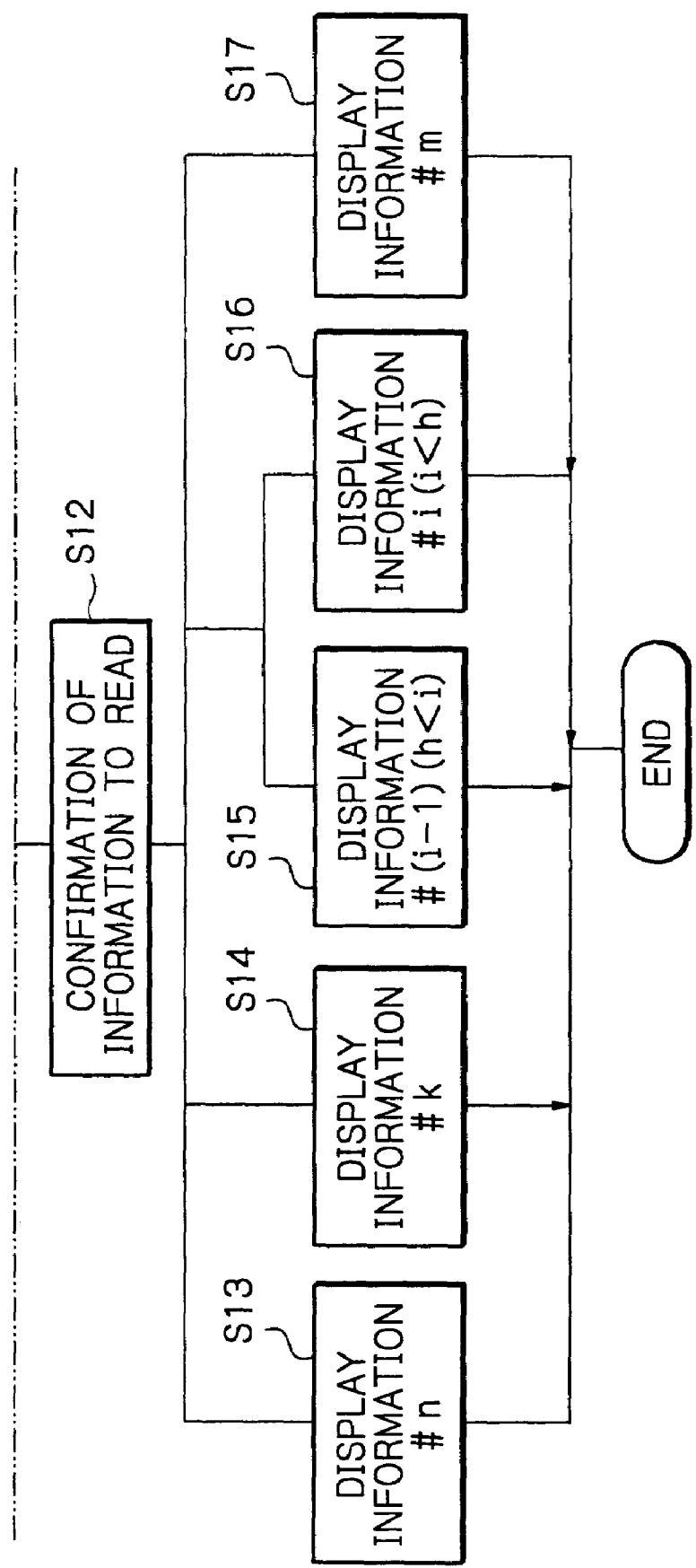

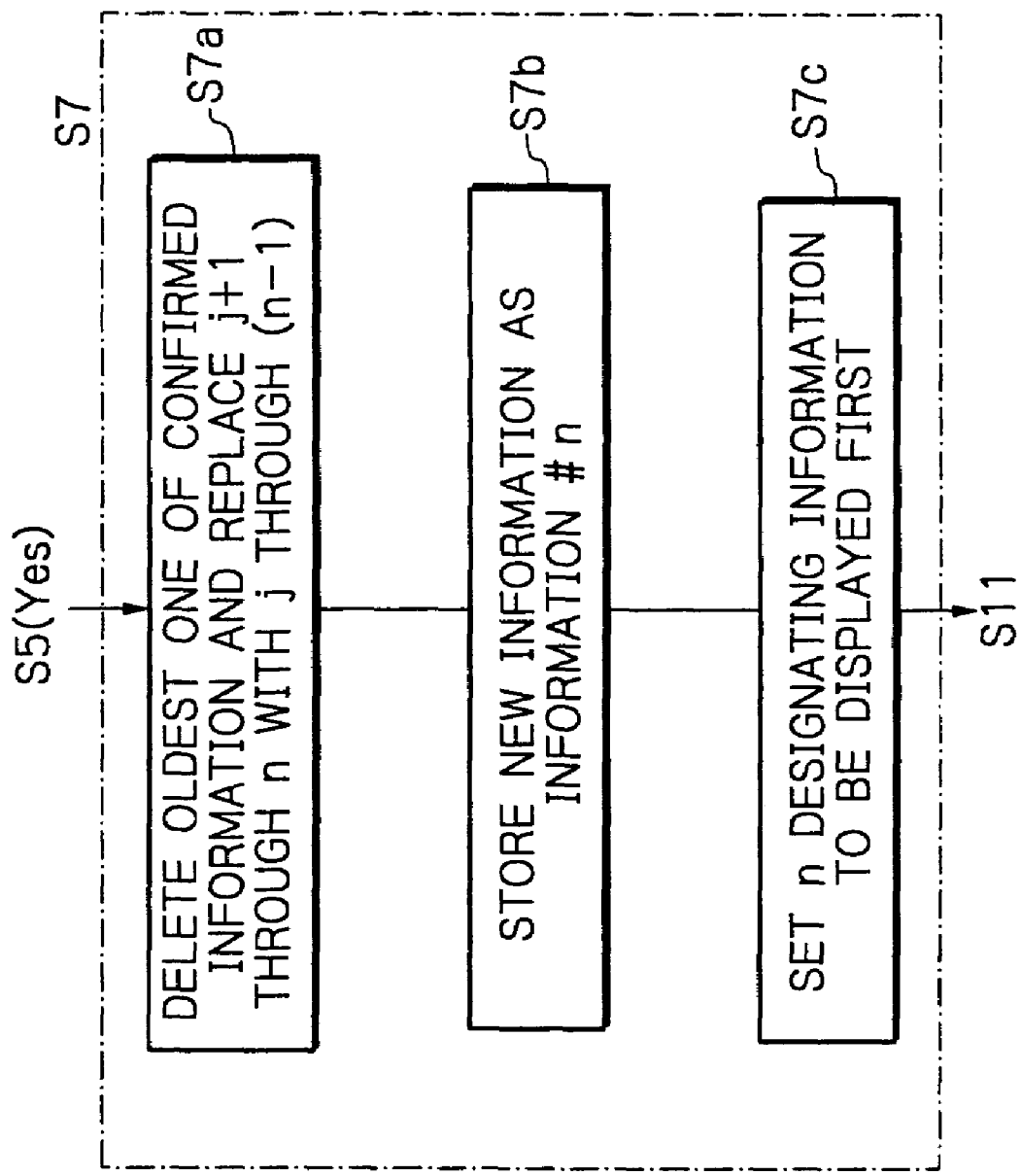

Fig. 8

BEFORE RECEIPT (a)

| INFORMATION NO. | CONFIRMATION FLAG | CONTENT |
|---|---|---|
| 5 | 1 | MNO |
| 4 | 0 | JKL |
| 3 | 1 | GHI |
| 2 | 0 | DEF |
| 1 | 1 | ABC |

AFTER RECEIPT (b)

| INFORMATION NO. | CONFIRMATION FLAG | CONTENT |
|---|---|---|
| 5 | 1 | PQR |
| 4 | 1 | MNO |
| 3 | 0 | JKL |
| 2 | 1 | GHI |
| 1 | 1 | ABC |

Fig. 10

BEFORE RECEIPT (a)

| INFORMATION NO. | CONFIRMATION FLAG | CONTENT |
|---|---|---|
| 5 | | |
| 4 | | |
| 3 | 1 | GHI |
| 2 | 0 | DEF |
| 1 | 0 | ABC |

AFTER RECEIPT (b)

| INFORMATION NO. | CONFIRMATION FLAG | CONTENT |
|---|---|---|
| 5 | | |
| 4 | 1 | PQR |
| 3 | 1 | GHI |
| 2 | 0 | DEF |
| 1 | 0 | ABC |

Fig. 12

BEFORE RECEIPT (a)

| INFORMATION NO. | CONFIRMATION FLAG | CONTENT |
|---|---|---|
| 5 | 1 | MNO |
| 4 | 0 | JKL |
| 3 | 1 | GHI |
| 2 | 0 | DEF |
| 1 | 0 | ABC |

AFTER RECEIPT (b)

| INFORMATION NO. | CONFIRMATION FLAG | CONTENT |
|---|---|---|
| 5 | 1 | PQR |
| 4 | 1 | MNO |
| 3 | 0 | JKL |
| 2 | 1 | GHI |
| 1 | 0 | DEF |

Fig. 14

BEFORE RECEIPT (a)

| INFORMATION NO. | CONFIRMATION FLAG | CONTENT |
|---|---|---|
| 5 | 1 | MNO |
| 4 | 0 | JKL |
| 3 | 1 | GHI |
| 2 | 0 | DEF |
| 1 | 0 | ABC |

AFTER RECEIPT (b)

| INFORMATION NO. | CONFIRMATION FLAG | CONTENT |
|---|---|---|
| 5 | 1 | PQR |
| 4 | 1 | MNO |
| 3 | 0 | JKL |
| 2 | 1 | GHI |
| 1 | 0 | ABC |

Fig. 16

BEFORE RECEIPT (a)

| INFORMATION NO. | CONFIRMATION FLAG | CONTENT |
|---|---|---|
| 5 | | |
| 4 | | |
| 3 | | |
| 2 | 1 | DEF |
| 1 | 0 | ABC |

AFTER RECEIPT (b)

| INFORMATION NO. | CONFIRMATION FLAG | CONTENT |
|---|---|---|
| 5 | | |
| 4 | | |
| 3 | 1 | PRQ |
| 2 | 1 | DEF |
| 1 | 0 | ABC |

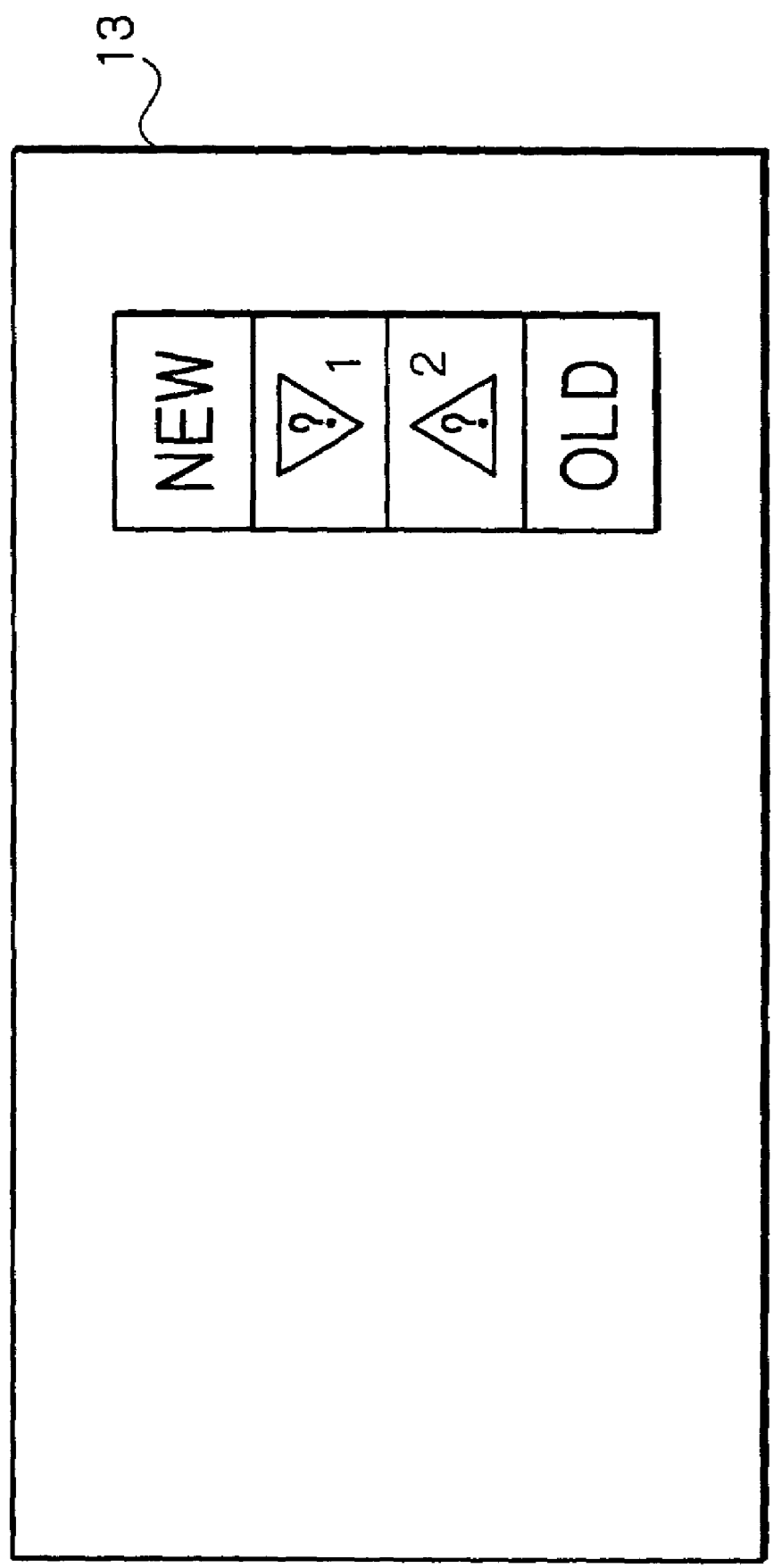

RADIO PAGER

CROSS-REFERENCE TO RELATED APPLICATION

This application is a continuation-in-part of U.S. Ser. No. 09/245,437, filed on Feb. 5, 1999, now abandoned.

BACKGROUND OF THE INVENTION

The present invention relates to a radio pager for selectively displaying a number of different stored information sent by broadcasting. More particularly, the present invention relates to a radio pager including a rotary switch for allowing the user of the pager to search the stored information and search them in a desired order.

Generally, a radio pager adaptive to broadcasting receives not only personal information including a telephone number to be called back by the user of the pager and a personal message, but also shared information including news and weather forecast and available with information services. The amount of shared information available from information services and stored in the pager is too great for the user of the pager to easily search. The user, in many cases, selects desired information by pressing button switches arranged on the pager. However, pressing the button switches while watching a miniature LCD (Liquid Crystal Display) mounted on the pager is troublesome.

Technologies relating to the present invention are disclosed in, e.g., Japanese Patent Laid-Open Publication No. 3-198537.

SUMMARY OF THE INVENTION

It is therefore an object of the present invention to provide a radio pager allowing the user of the pager to select a number of received information in either one of an ascending order and a descending order.

It is another object of the present invention to provide a radio pager allowing the user of the pager to select a number of received information in any desired order.

It is a further object of the present invention to provide a radio pager allowing the user of the pager to search for desired information rapidly.

A radio pager of the present invention includes a display for selectively displaying a number of received information sent by broadcasting. A selecting section allowing the user of the pager to select, by turning a rotary switch in a jog dial fashion, either one of an ascending order in which the received information are sequentially read from the oldest one to the newest one or a descending order in which they are sequentially read from the newest one to the oldest one. The radio pager also includes a interface means 20 for inputting various user commands for management of the stored or shared information. The radio page interface means 20 allows the user to confirm, delete, select, rearrange the stored or shared information.

BRIEF DESCRIPTION OF THE DRAWINGS

The above and other objects, features and advantages of the present invention will become more apparent from the following detailed description taken with the accompanying drawings in which:

FIG. 2 is a schematic block diagram showing a specific configuration of an operation controller included in the illustrative embodiment;

FIG. 3 is an external view of the illustrative embodiment;

FIG. 7 is a flowchart showing a subroutine included in the main routine in detail;

FIG. 8 is a view for describing the subroutine of FIG. 7;

FIG. 10 is a view for describing the subroutine of FIG. 9;

FIG. 12 is a view for describing the subroutine of FIG. 11;

FIG. 14 is a view for describing the subroutine of FIG. 13;

FIG. 16 is a view for describing the subroutine of FIG. 15; and

FIG. 17 shows an alternative embodiment of the present invention.

DESCRIPTION OF THE PREFERRED EMBODIMENTS

Figure 1:
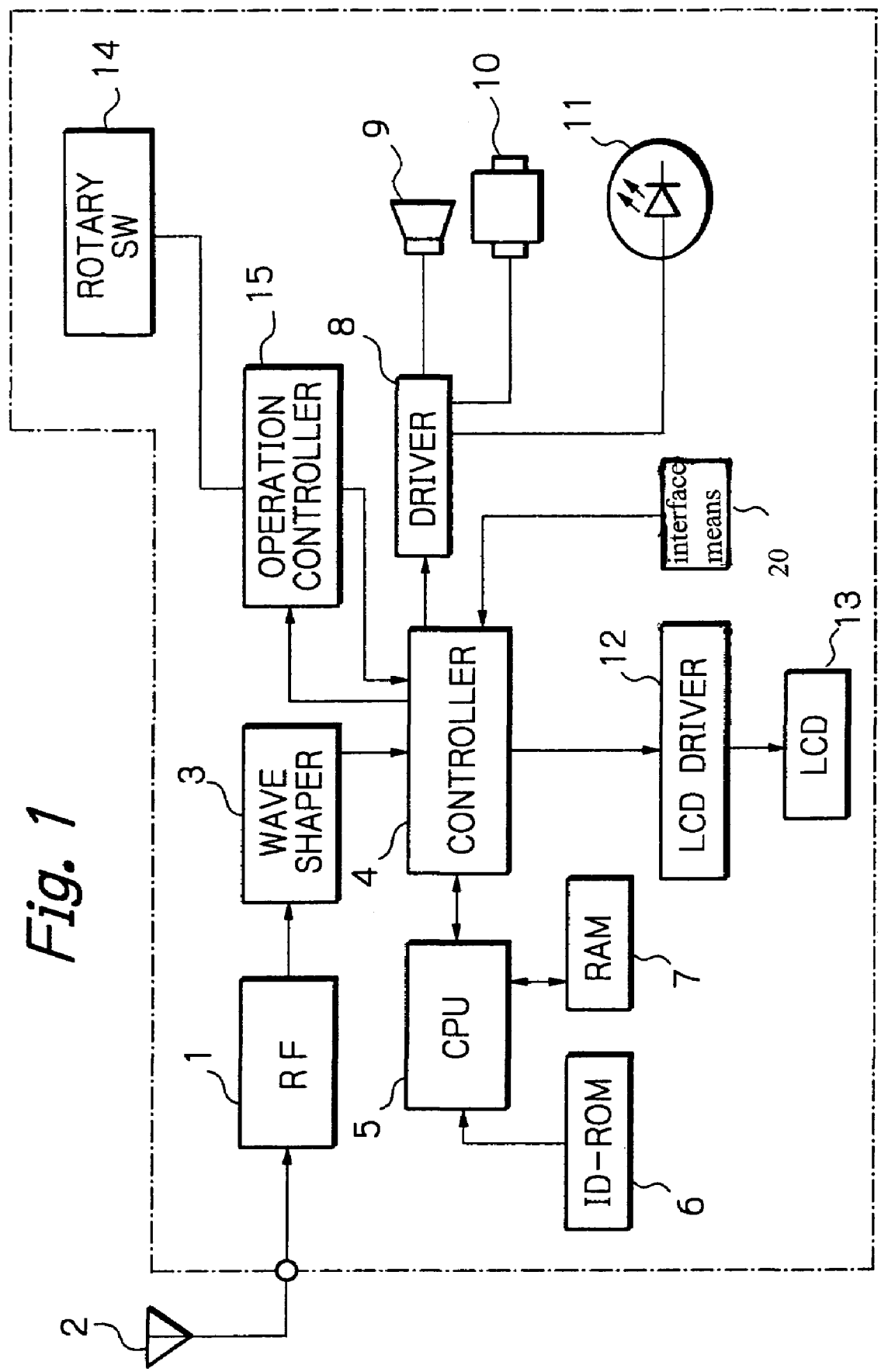
FIG. 1 is a block diagram schematically showing a radio pager embodying the present invention.

Referring to FIG. 1 of the drawings, a radio pager embodying the present invention is shown and includes an antenna 2. An RF (Radio Frequency) section or receiving section 1 executes amplification, frequency conversion and demodulation with a radio wave coming in through the antenna 2. The radio wave is representative of personal information or broadcast shared information. A wave shaper 3 transforms a demodulated signal output from the RF section 1 to a signal capable of being processed by the following circuitry. A controller 4 executes various kind of control relating to the pager.

Specifically, on receiving a call meant for the pager, the controller 4 alerts the user of the pager to the call incoming and displays received information. When a number of different information are stored in the pager. The controller 4 allows them to be read out from the oldest one to the newest one in an ascending order or allows them to be read out from the newest one to the oldest one in a descending order. Also, the controller 4 allows the user to set any desired order in which the information should be displayed and then search the information.

A CPU (Central Processing Unit) 5 compares a received address number and an address number stored in a rewritable ID-ROM (Identification Read Only Memory) 6 beforehand. Also, the CPU 5 stores received information (both personal and shared) and reads them out, a RAM (Random Access Memory) 7 sequentially stores broadcast information received and allows them to be read out. A driver 8 delivers an alert drive signal to each of a speaker 9, a vibrator 10, and an LED (Light Emitting Diode) 11. In response, the speaker 9, vibrator 10 and LED 11 respectively produces an alert tone, vibrates and blinks so as to alert the user to the receipt of a call.

An LCD driver 12 feeds a drive signal to an LCD (Liquid Crystal Display) 13. Specifically, the controller 4 delivers to the LCD driver 12 a signal representative of a telephone number to be called back by the user, a message meant for the user or similar personal information or a signal representative of news, weather forecast or similar shared information available with an information service. The LCD driver 12 transforms such a signal received from the controller 4 to a corresponding drive signal and feeds it to the LCD 13. In response, the LCD 13 displays the personal information or the shared information represented by the drive signal.

A rotary switch (SW) 14 may be operated by the user in either one of directions A and B (see FIG. 3) for causing the stored information to be displayed in the ascending order or the descending order. An operation controller 15 is responsive to the user's operation of the rotary SW 14. The operation controller 15 delivers to the controller 4 either a pulse addition signal or a pulse subtraction signal for reading the information stored in the RAM 7 and designated by an information number. Information numbers are output in the ascending order or the descending order in accordance with the operation of the rotary SW 14.

FIG. 2 shows the operation controller 15 in detail. As shown, the operation controller 15 includes an identification 16 for identifying the direction of rotation of the rotary SW 14 and outputting a particular pulse for each angular position of the rotary SW 14. A switch 17 in the operation controller determines whether the information stored in the RAM 7 should be displayed in the ascending order or whether they should be displayed in the descending order. An adder 18 adds pulses output from the identification 16 and sends to the controller 4 the previously mentioned pulse addition signal for reading and displaying the above information in the ascending order. A subtracter 19 subtracts the output pulses of the identification 16 and sends to the controller 4 the previously mentioned pulse subtraction signal for reading and displaying the above information in the descending order.

Figures 4, 5:
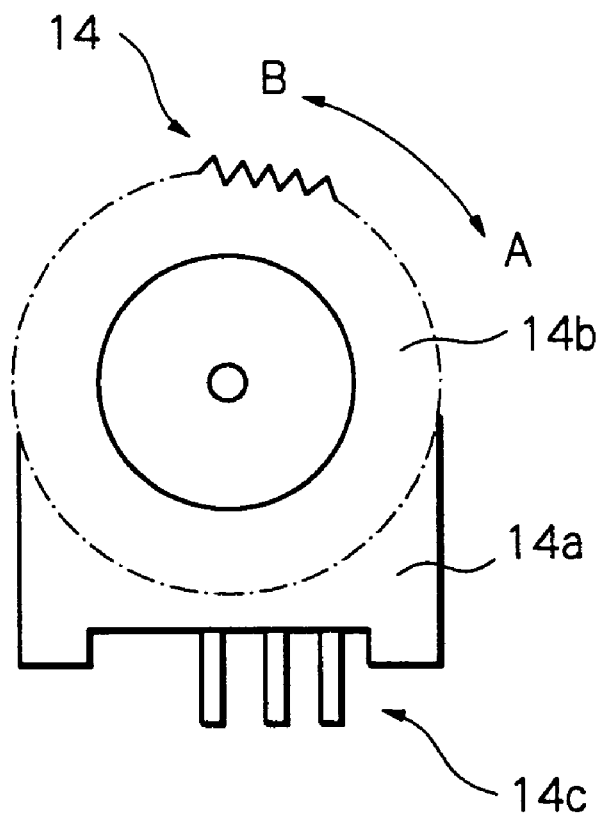
FIG. 4 is an external view showing a rotary switch included in the illustrative embodiment.
FIG. 5 is a timing chart representative of the operation of the operation controller.

As shown in FIG. 3, the LCD 13 is mounted on the front of the pager while the rotary SW 14 is mounted on the top right portion of the pager. A rotary dial is associated with the rotary SW 14 and protrudes from the pager, so that the user can turn it in the direction A or B, as desired. Specifically, as shown in FIG. 4, the rotary switch 14 includes a body portion 14a including a rotary dial 14b.

Leads 14c extend out from the body portion 14a and connected to stationary contacts and a movable contact not shown.

In operation, when a broadcast signal is received via the antenna 2, the RF section 1 executes amplification, frequency conversion and demodulation with the received signal. The wave shaper 3 transforms the demodulated signal to a signal capable of being processed by the following circuitry and applies the transformed signal to the controller 4. The controller 4 reads the address number stored in the CD-ROM 6 and compares it with an address number included in the received signal under the control of the CPU 5. If the two address numbers compare equal, the controller 4 causes the driver 8 to drive the speaker 9, vibration 10, and LED 11, as stated earlier.

The user may select one, two or all of the speaker 9, vibrator 10 and LED 11 beforehand via the interface means 20 connected to the controller 4. In response to the alert drive signal received from the driver 8, the speaker 9 produces an alert tone, the vibrator 10 vibrates, and/or the LED 11 blinks. At the same time, the content of the call, e.g., a telephone number to be called back by the user or a message meant for the user is displayed on the LCD 13 via the LCD driver 12.

The interface means 20 also is used to set various functions including a method of confirming received messages, and delete any stored information on command. In operation, the user inputs a delete command, a confirmation that the message is received, or read, through the interface means 20. In operation, the user inputs a command into the interface means 20 for a desired data management function. In response the controller 4 responds to the input command and causes the function to be executed.

More specifically, the content of the call is either one of personal information including a telephone number to be called back and a personal message and shared information available with an information service, as stated earlier. Such received information are sequentially written to the RAM 7 under the control of the controller 4 and CPU 5. Subsequently, the operation controller 15 outputs a read operation signal in response to the user's operation of the interface means 20 and rotary SW 14. On receiving the read operation signal, the controller 4 causes information designated by the read operation signal to be read out of the RAM 7 and displayed on the LCD 13 via the LCD driver 12.

When the user turns the rotary switch 14 in the direction A or B, the stored information are sequentially displayed on the LCD 13 in the ascending order or the descending order, respectively. When the user watching the LCD 13 inputs a delete command on, e.g., the interface means 20, the information provided with a corresponding number and stored in the RAM 7 is deleted by control means. The user may also operate the interface means 20 to input either one of the ascending order and descending order, as stated earlier.

A specific operation of the illustrative embodiment relating to the user's operation of the rotary SW 14 will be described hereinafter. The user turns the dial 14b of the rotary SW 14 in the desired direction A or B, as shown in FIGS. 2 and 4. The identification 16 and rotary SW 14 shown in FIG. 2 operate in interlocked relation to each other. As shown in FIG. 5, when the rotary SW 14 is turned in the direction A, it outputs pulses on a terminal A-GND (ground) at predetermined intervals. At the same time, the rotary SW 14 outputs pulses on a terminal B-GND which are delayed from the above pulses by a period of time T. On the other hand, when the rotary SW 14 is turned in the direction B, it outputs pulses on the terminal B-GND at preselected intervals while outputting pulses delayed from such pulses by the period of time T on the terminal A-GND.

The pulses output from the rotary SW 14 are input to the identification 16 of the operation controller 15. The identification 16 identifies the direction A or B on the basis of the delay (phase delay) T of the pulses. Further, the adder 18 adds or the subtracter 19 subtracts 19 the pulses input from the identification 16 via the switch 17. A pulse addition signal output from the adder 18 or a pulse subtraction signal output from the subtracter 19 is delivered to the controller 4. The controller 4 receiving the pulse addition signal or the pulse subtraction signal sequentially reads the information out of the RAM 7 in the ascending order or the descending order. That is, the controller 4 sequentially reads out the information designated by sums output from the adder 18 or differences output from the subtracter 19, while causing the read information to appear on the LCD 13.

The user operates the SW 14 to select either one of the ascending order and descending order for reading the information out of the RAM 7 via the controller 4. That is, based on the direction of rotation of SW 14 and the output of the identification 16 user causes the switch 17 to select either one of the adder 18 and subtracter 19. For example, when the user turns the dial 14*b* in the direction A, the pulse addition signal representative of a sum output from the adder 18 is fed to the controller 4 in accordance with the reading order selected by the user.

When the user turns the dial 14*b* in the direction B, the subtracter 19 delivers the pulse subtraction signal representative of a difference output from the subtracter 19 is fed to the controller 4. The controller 4 received the sum or the difference controls the CPU 5 in order to read, among the information stored in the RAM 7, the information designated by a number corresponding to the sum or the difference. This allows the CPU 5 to sequentially read the information out of the RAM 7 in the ascending order, i.e., from the oldest one to the newest one or the descending order, i.e., from the newest one to the oldest one. Such information are sequentially sent to and displayed on the LCD 13 via the LCD driver 12 under the control of the controller 4.

As stated above, the user can easily select any one of various information, both personal and shared, by operating the rotary switch 14 in a jog dial fashion. That is, the user can search for desired information easily and rapidly.

The illustrative embodiment allows the user to set even a desired order in which the numerous information stored in the RAM 7 should be read and displayed, as follows. This alternative procedure will be described specifically with reference to FIG. 6. As shown, the user operates the interface means 20 for commanding the controller 4 which of the newest and oldest received information stored in the RAM 7 should be displayed first (step S1). In response, the controller 4 determines the information to be displayed first (step S2). Then, the pager waits for the receipt of information (step S3*a* or S3*b*). On the receipt of information sent by broadcasting, the information is written to the RAM 7 (step S4*a* or S4*b*). The controller 4 determines whether or not n different information are present in the RAM 7 (step S5 or S6).

Subsequently, the controller 4 executes one of steps S7—S10 (subroutines (A)–(D) which will be described later) for storing the received information and setting the number of information to display first when the user selects and confirms unconfirmed information (step S7, S8, S9 or S10). Thereafter, when the pager is waiting for information, the user operates the interface means 20 in order to confirm unconfirmed information provided with a confirmation flag of (logical) ZERO or (logical) ONE (steps S11 and S12). The information designated by the set number appears on the LCD 13 (step S13, S14, S15, S16 or S17). When the unconfirmed information is confirmed, by the user, it is provided with the confirmation flag of ZERO. When the unconfirmed information is left unconfirmed, it is provided with the confirmation flag of ONE.

Figure 6B:
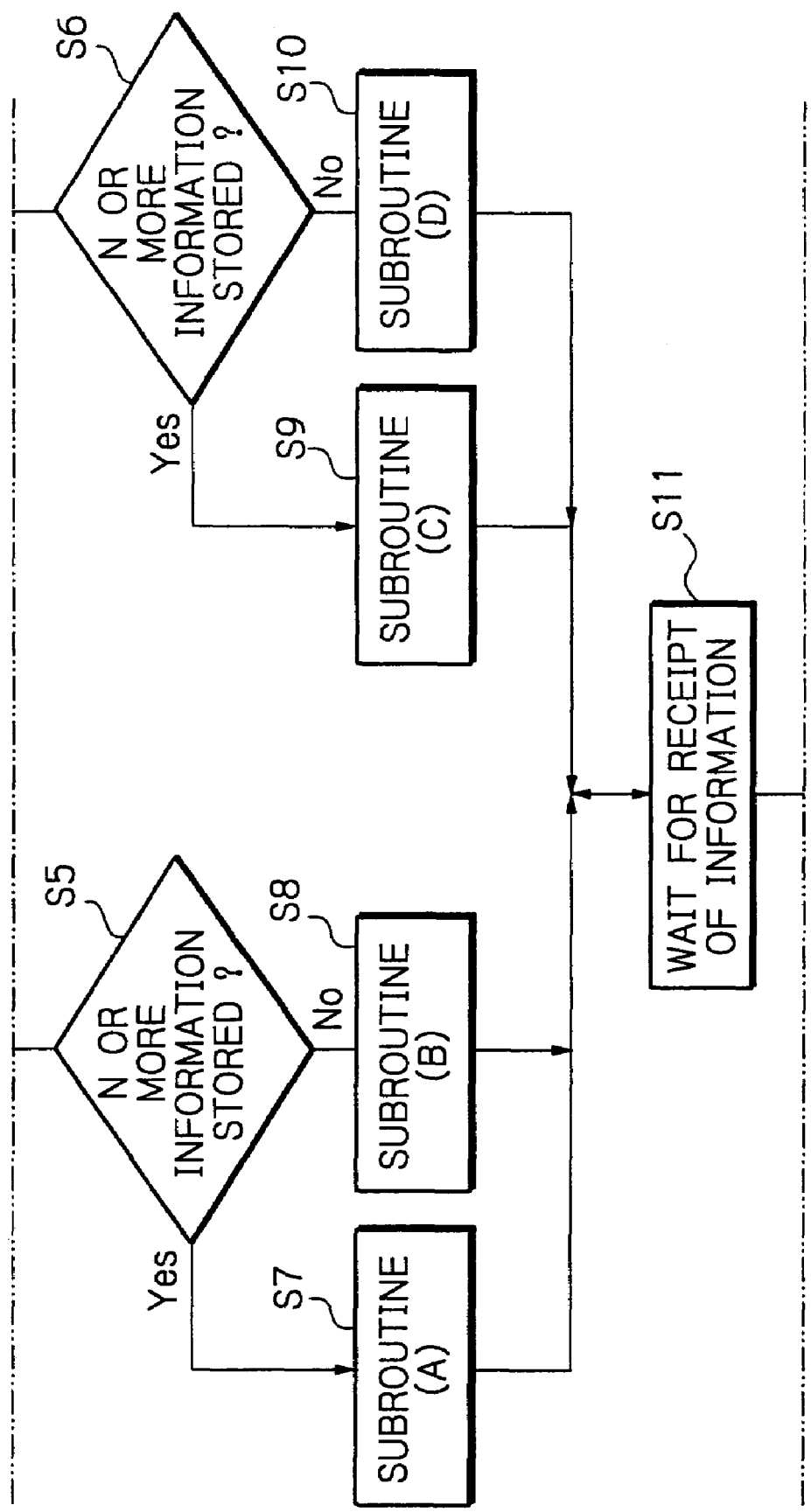
FIG. 6 is a flowchart demonstrating a main routine to be executed by the illustrative embodiment.

FIG. 7 shows the step S7 or subroutine (A), FIG. 6, in detail while FIG. 8 shows a specific information storage area included in the RAM 7 for describing the subroutine (A). Information number #j (integer lying in the range of $1<j\leq n$) is attached to the oldest received information whose confirmation flag is ZERO. Assume that the user sets the newest one of unconfirmed information, and that n or more information have already been stored in the RAM 7 (Yes, step S5). Then, on the receipt of new information, the controller 4 deletes the oldest confirmed information #j and replaces information numbers #(j+1) through #n with #j through #(n−1), respectively (step S7*a*). Subsequently, the controller 4 stores the received information in the RAM 7 as information #n (step S7*b*) and sets #n designating information to be displayed first at the time of user's confirmation (step S7*c*). When the user manipulates the pager waiting for information in order to see information, the information #n is displayed first (steps S11, S12 and S13, FIG. 6).

Specifically, FIG. 8 shows a condition of the information storage area before receipt (a) and a condition of the same after receipt (b). As shown, when information "PQR" is newly received in the condition (a), information #3 through #5 are respectively shifted to positions indicated by #2 through #4, as indicated by an arrow. At the same time, the information "PQR" is stored in a position indicated by #5. In the resulting condition (b), #5 is set as n designating information to be displayed first.

Figure 9:
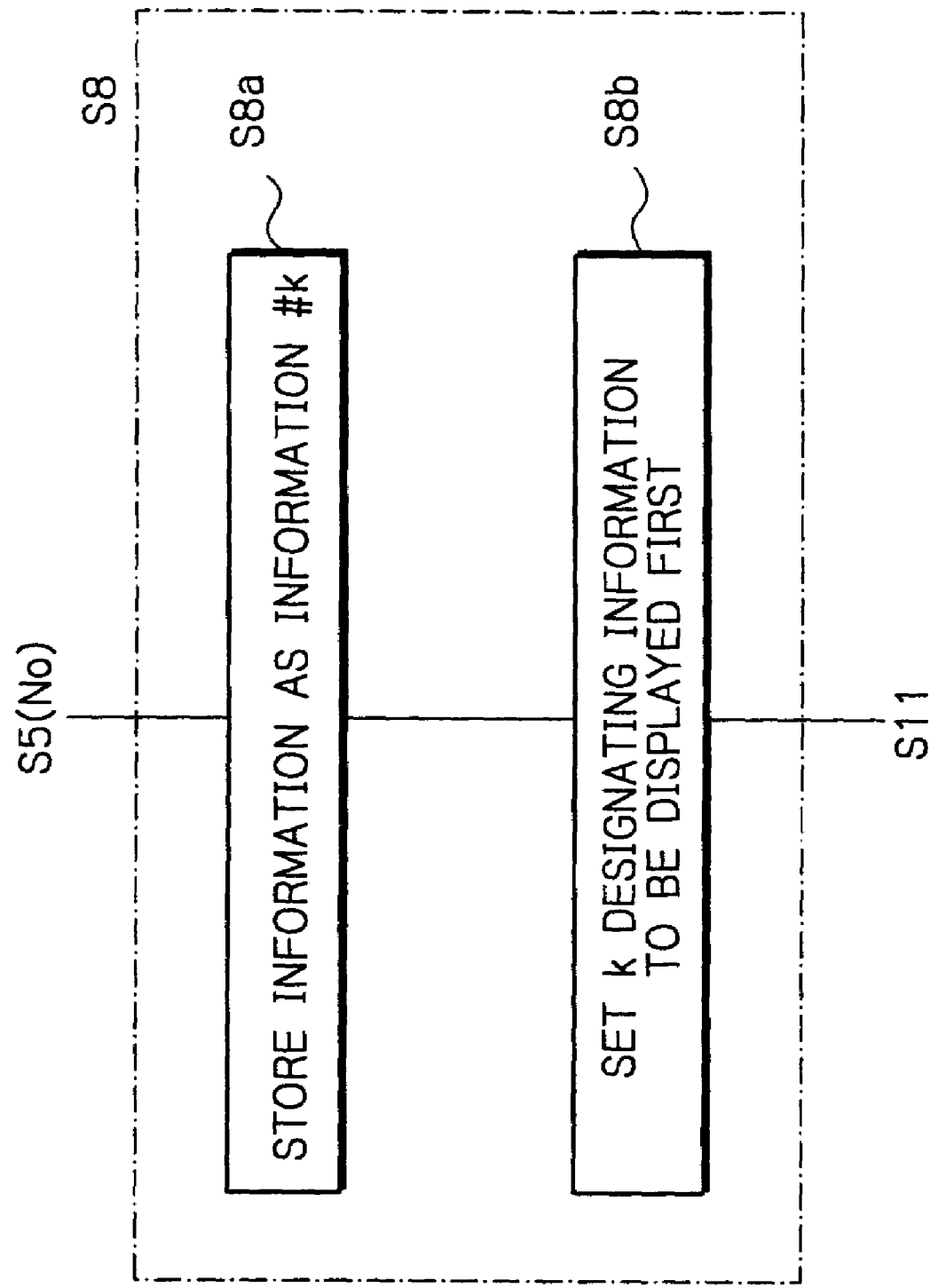
FIG. 9 is a flowchart showing another subroutine included in the main routine in detail.

FIG. 9 shows the step S8 or subroutine (B). FIG. 6, in detail while FIG. 10 shows the information storage area of the RAM 7 for describing the subroutine (B). Assume that the user sets the newest one of unconfirmed information, but the number of information stored in the RAM 7 is smaller than n (No, step S5). Then, on the receipt of new information, information number #k (integer lying in a range of $1\leq k\leq n$) is attached to the new information (step S8*a*). The controller 4 sets #k designating information to be displayed first at the time of user's confirmation (step S8*b*). When the user manipulates the pager waiting for information in order to see information, via either SW 14 or the interface means 20 the information #k is displayed first (steps S11, S12 and S14, FIG. 6).

Specifically, FIG. 10 shows a condition of the information storage area before receipt (a) and a condition of the same after receipt (b). As shown, when information "PQR" is newly received in the condition (a), the information "PQR" is stored. In a position indicated by #4. In the resulting condition (b), #4 is set as k designating information to be displayed first.

Figure 11:
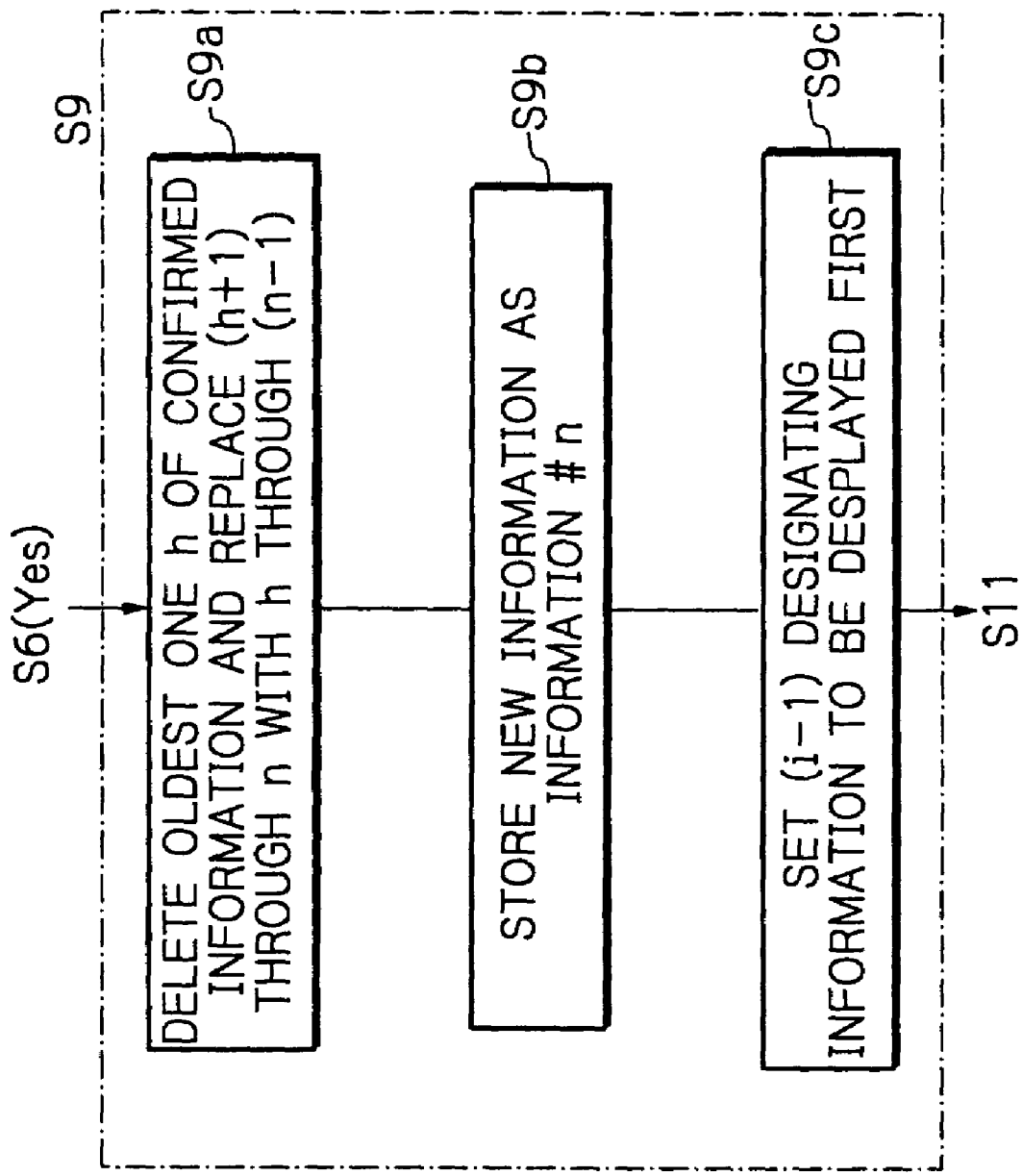
FIG. 11 is a flowchart showing another subroutine included in the main routine in detail.

FIG. 11 shows the step S9 or subroutine (C), FIG. 6, in detail 310 while FIG. 12 shows the information storage area included in the RAM 7 for describing the subroutine (C). Information number #h (integer lying in the range of $1<h\leq n$) is attached to the oldest received information whose confirmation flag is ZERO. Also, information number #i (integer lying in a range of $1\leq i\leq n; h\neq 1$) is attached to the oldest received information whose confirmation flag is ONE.

Assume that h is smaller than i, that the user sets the oldest one of unconfirmed information, and that n or more information have already been stored in the RAM 7 (Yes, step S6). Then, on the receipt of new information, the controller 4 deletes the oldest confirmed information #h and replaces information numbers #(h+1) through #n with #h, through #(n−1), respectively (step S9*a*). Subsequently, the controller 4 stores the received information in the RAM 7 as information #n (step S9*b*) and sets #(i−1) designating information to be displayed first at the time of user's confirmation (step S9*c*). When the user manipulates the pager waiting for information in order to see information, the information #(i−1) is displayed first (steps S11, S12 and S15, FIG. 6).

Specifically, FIG. 12 shows a condition of the information storage area before receipt (a) and a condition of the same after receipt (b). As shown, when information "PQR" is newly received in the condition (a), information #2 through #5 are respectively shifted to positions indicated by #1 through #4, as indicated by an arrow. At the same time, the information "PQR" is stored in a position indicated by #5. In the resulting condition (b), #(i−1)=2 designating information to be displayed first is set.

Figure 13:
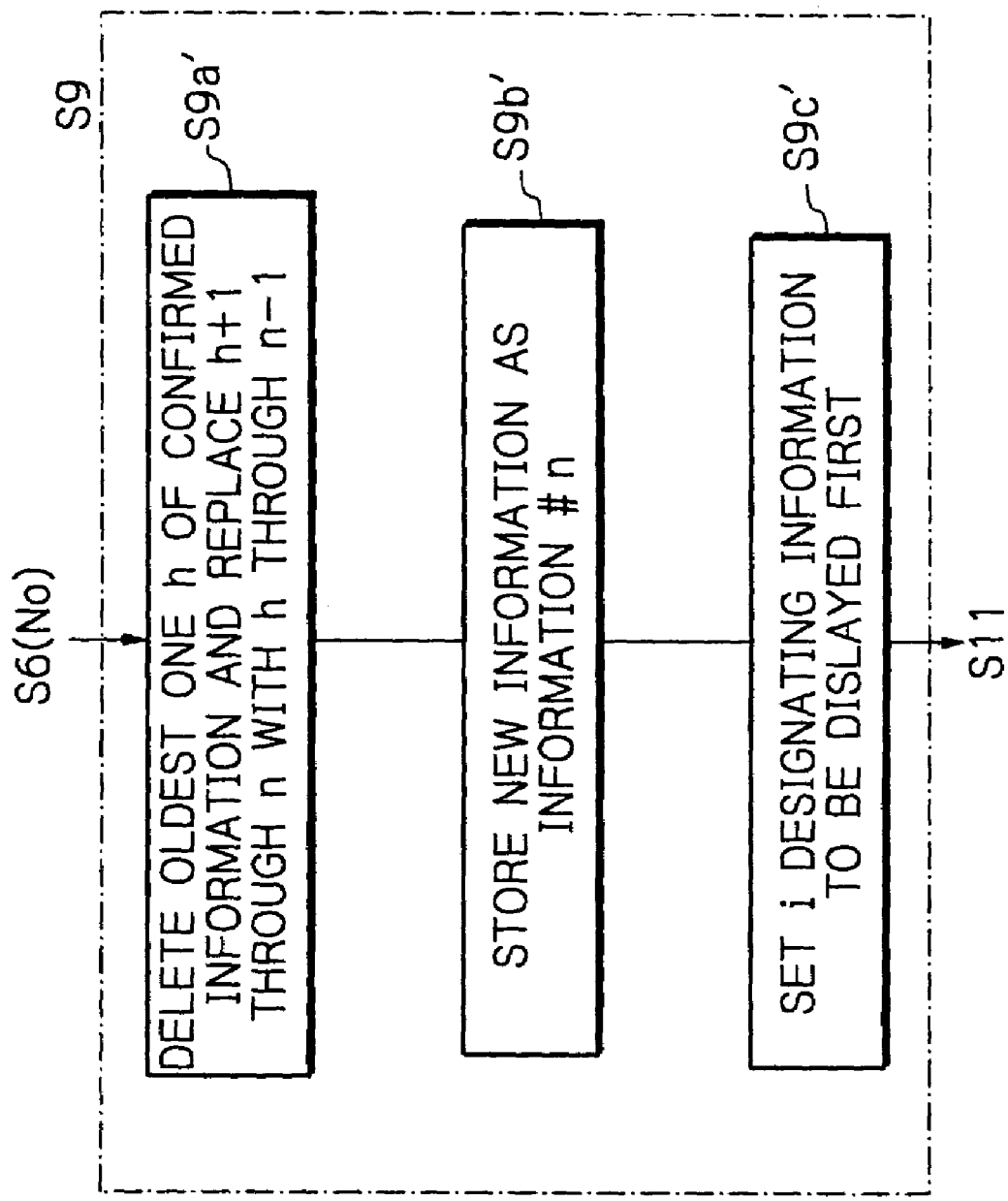
FIG. 13 is a flowchart showing another subroutine included in the main routine in detail.

FIG. 13 shows an alternative subroutine (C) while FIG. 14 shows the information storage area of the RAM 7 associated therewith. Again, information number #h (integer lying in the range of 1<h≦n) is attached to the oldest received information whose confirmation flag is ZERO. Also, information number #i (integer lying in a range of 1≦i≦n; h≠1) is attached to the oldest received information whose confirmation flag is ONE.

Assume that h is smaller than i, that the user sets the oldest one of unconfirmed information, and that n or more information have already been stored in the RAM 7 (Yes, step S6). Then, on the receipt of new information, the controller 4 deletes the oldest confirmed information #h and replaces information numbers #h through "(n−1) with #h through #(n−1), respectively (step S9a). Subsequently, the controller 4 stores the received information in the RAM 7 as information #n (step S9b) and sets #i designating information to be displayed first at the time of user's confirmation (step S9c). When the user manipulates the pager waiting for information in order to see information, the information #i is displayed first (steps S11, S12 and S16, FIG. 6).

Specifically, FIG. 14 shows a condition of the information storage area before receipt (a) and a condition of the same after receipt (b). As shown, when information "PQR" is newly received in the condition (a), information #4 and #5 are respectively shifted to positions indicated by #3 and #4, as indicated by an arrow. At the same time, the information "PQR" is stored in a position indicated by #5. In the resulting condition (b), #i=1 designating information to be displayed first is set.

Figure 15:
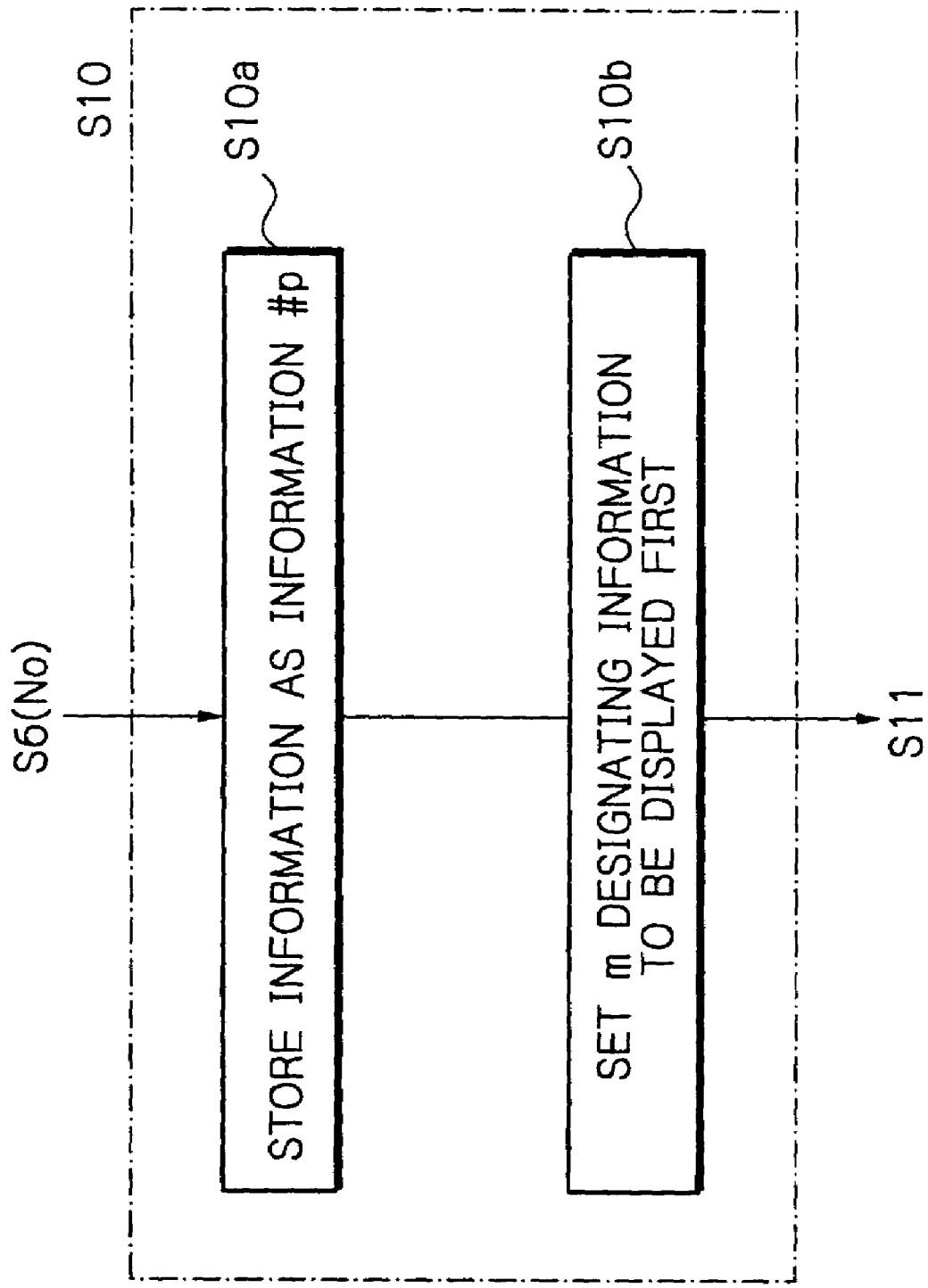
FIG. 15 is a flowchart showing another subroutine included in the main routine in detail.

FIG. 15 shows the step S10 or subroutine (D), FIG. 6, in detail while FIG. 16 shows the information storage area of the RAM 7 associated therewith. As shown, assume that the user sets the oldest one of unconfirmed information, and that the number of information stored in the RAM 7 is smaller than n (No, step S6). Then, on the receipt of new information, the controller 4 stores the received information in the RAM 7 as information #p (integer lying in the range of 1<p<n) (step S10a) and sets #m designating information to be displayed first at the time of user's confirmation (step S10b). When the user manipulates the pager waiting for information in order to see information, the information #m is displayed first (steps S11, S12 and S17, FIG. 6).

Specifically, FIG. 16 shows a condition of the information storage area before receipt (a) and a condition of the same after receipt (b). As shown, when information "PQR" is newly received in the condition (a), the information "PQR" is stored in a position indicated by #3. In the resulting condition (b), #m=2 designating information to be displayed first is set.

As stated above, the user can cause the pager to select and display numerous stored information, both personal and shared, in any desired order simply by turning the rotary switch 14 in a jog dial fashion. This promotes easy and efficient search and therefore rapid selection of desired information. Furthermore, the user is capable to select, confirm, and delete, numerous stored information, in any order by including a specific command via the interface means 20.

An alternative embodiment of the present invention is as follows. The rotary switch 14, FIG. 1, is operated by the user in a jog dial fashion in order to see the personal or shared information received. FIG. 17 shows a specific picture to appear on the LCD 13 when the operator operates the interface means 20 in a preselected manner. As shown, the picture includes "NEW" and "OLD" representative of the newest information and oldest information, respectively, and numbers "1" and "2". The user watching such a picture touches the number "1" or "2" for selecting the newest information "NEW" or the oldest information "OLD", respectively.

After the above selection, the user can turn the dial 14b of the rotary switch 14 in the direction A or B in order to select the information stored in the RAM 7 in the ascending order or the descending order. At this instant, the picture shown in FIG. 17 clearly shows the user the ascending order to the descending order selected.

In summary, in accordance with the present invention, a radio pager displays a number of stored information in the ascending order or the descending order selected by the user on a rotary switch included in the pager. In addition, the pager allows the user to see any desired information first by rearranging the information in a storage area on the basis of an information flag and a content, by inputting the command via the interface means 20. The user can therefore select personal and shared information stored in the pager by turning the rotary switch in a jog dial fashion in the ascending order or the descending order or even in any desired order. The user can also input various commands through the interface means 20 for managing stored information and select the manner in which the radio pager notifies the user that new message has been received. This enhances easy and efficient search and rapid information selection.

Various modifications will become possible for those skilled in the art after receiving the teachings of the present disclosure without departing from the scope thereof.

What is claimed is:

1. A radio pager comprising:
   display means for selectively displaying a number of received information sent by broadcasting; and
   selecting means for allowing a user of said radio pager to select by rotating a rotary switch as a jog dial, either one of an ascending order in which the received information are sequentially read from an oldest one to a newest one or a descending order in which said received information are sequentially read from said newest one to said oldest one.

2. A radio pager as claimed in claim 1, further comprising setting means for rearranging the received information in a preselected storage area on the basis of an information number, a confirmation flag, and a content to thereby allow the user to search for any desired information first by turning said rotary switch in combination with inputting a command in an interface means.

3. A radio pager as claimed in claim 2, wherein assuming that said storage area is capable of storing n different information, and that the user has confirmed m-the information (1<m<n), said setting means replaces on receipt of k (n<m+k) information, first information to appear when the user performs confirmation later and a display order of said information.

4. A radio pager as claimed in claim 1, wherein said selecting means comprises:
   receiving means for receiving a radio wave sent by broadcasting to thereby output a demodulated signal;
   control means for alerting the user to receipt of a call and executing control for causing the received information to be displayed in the ascending order or the descending order in accordance with a user's operation of said rotary switch, interface means and control for allowing the user to search and select said received information in any desired order;

storing means for storing an address number assigned to said radio pager beforehand and storing the received information;

alerting means caused by said controller to alert the user when a received address number is identical with the address number stored in said storing means; and operation control means for feeding to said control means a signal for causing the received information stored in said storing means to be read out in the ascending order or the descending order in accordance with a direction in which the user turns said rotary switch and operation of said interface means.

5. A radio pager as claimed in claim 4, further comprising a key section connected to said control means and interface means allowing the user to search and select for any desired received information first by turning said rotary switch.

6. A radio pager as claimed in claim 4, wherein said operation control means comprises:

an identifying section for identifying the direction of rotation of said rotary switch and sending a pulse for each angular position of said rotary switch;

a switching section for setting either one of the ascending order and the descending order;

an adding section for adding pulses output from said switching section and feeding a resulting pulse addition signal to said control means to thereby read and display the received information in the ascending order; and a subtracting section for subtracting pulses output from said switching section and feeding a resulting pulse subtraction signal to said control means to thereby read and display the received information in the descending order.

7. A radio pager as claimed in claim 1, wherein the received information include personal information including a telephone number to be called back by the user and a personal message, and shared information including news and weather forecast available with information services.

8. A radio pager as claimed in claim 1, wherein said rotary switch includes an operating portion protruding from a side of said radio pager.

9. A radio pager as claimed in claim 1, further comprises an interface means for receiving a command to confirm, select, rearrange or delete numerous stored information.

10. A radio pager as claimed in claim 1, further comprises an interface means for selecting at least one notification means so as to alert the user of the receipt of a call or new shared information.

* * * * *